United States Patent
Barten et al.

(10) Patent No.: US 12,160,092 B2
(45) Date of Patent: Dec. 3, 2024

(54) LINE GUIDE DEVICE FOR CLEANROOM APPLICATIONS AND ALSO SUPPORTING CHAIN AND CHAIN LINK FOR IT

(71) Applicant: IGUS GMBH, Cologne (DE)

(72) Inventors: Dominik Barten, Meckenheim (DE); Peter Mattonet, Kuerten (DE)

(73) Assignee: IGUS GMBH, Cologne (DE)

( * ) Notice: Subject to any disclaimer, the term of this patent is extended or adjusted under 35 U.S.C. 154(b) by 228 days.

(21) Appl. No.: 17/757,187

(22) PCT Filed: Dec. 11, 2020

(86) PCT No.: PCT/EP2020/085861
§ 371 (c)(1),
(2) Date: Jun. 10, 2022

(87) PCT Pub. No.: WO2021/116467
PCT Pub. Date: Jun. 17, 2021

(65) Prior Publication Data
US 2023/0006432 A1      Jan. 5, 2023

(30) Foreign Application Priority Data
Dec. 13, 2019   (DE) ............... 20 2019 106 979.1

(51) Int. Cl.
*H02G 11/00* (2006.01)
*F16G 13/16* (2006.01)
*H02G 3/04* (2006.01)

(52) U.S. Cl.
CPC .......... *H02G 11/006* (2013.01); *F16G 13/16* (2013.01); *H02G 3/0487* (2013.01)

(58) Field of Classification Search
CPC ..... F16G 13/16; H02G 11/006; H02G 3/0487
See application file for complete search history.

(56) References Cited

U.S. PATENT DOCUMENTS 8,882,052 B2   11/2014   Komiya
9,368,951 B2    6/2016   Komiya
(Continued)

FOREIGN PATENT DOCUMENTS

DE   1281350   10/1968
DE   2141709    3/1973
(Continued)

OTHER PUBLICATIONS

International Search Report from corresponding PCT Appln. No. PCT/EP2020/085861 dated Mar. 23, 2021.
(Continued)

*Primary Examiner* — Mohammed S. Alawadi
(74) *Attorney, Agent, or Firm* — Grossman, Tucker, Perreault & Pfleger, PLLC (57) ABSTRACT

A line guide device comprising an envelope for supply lines and an articulated support chain. One chain link has an inside projection in a first longitudinal portion and an inside cross-bridge with an extended stop face and a recess adjoining the cross-bridge in a second longitudinal portion. In the extended position, the projection of one chain link engages in the recess of the following chain link and on the cross-bridge thereof. A support chain, in which each chain link has, in its second longitudinal portion, an outside cross-connection which in the arcuate position interacts with an outside arc stop face of the first longitudinal portion and has an inside cross-connection which in the extended position interacts with an inside extended stop face of the first longitudinal portion.

20 Claims, 4 Drawing Sheets

(56) References Cited

U.S. PATENT DOCUMENTS

| | | | |
|---|---|---|---|
| 9,816,584 B2 | 11/2017 | Tatsuta et al. | |
| 2011/0121141 A1* | 5/2011 | Tatsuta | F16G 13/20 |
| | | | 248/49 |
| 2012/0205498 A1* | 8/2012 | Komiya | H02G 11/006 |
| | | | 248/49 |
| 2012/0228437 A1* | 9/2012 | Tatsuta | H02G 11/006 |
| | | | 248/49 |

FOREIGN PATENT DOCUMENTS

| | | |
|---|---|---|
| DE | 102010053317 | 6/2011 |
| DE | 102011015119 | 6/2011 |
| DE | 102012100359 | 7/2012 |

OTHER PUBLICATIONS

International Preliminary Report on Patentability from corresponding PCT Appln. No. PCT/EP2020/085861 dated Feb. 25, 2022.

\* cited by examiner

LINE GUIDE DEVICE FOR CLEANROOM APPLICATIONS AND ALSO SUPPORTING CHAIN AND CHAIN LINK FOR IT

FIELD

The invention relates in general to a line guide device, in particular for cleanroom applications, for dynamically guiding supply lines, such as cables, hoses or the like, between two connection points at least one of which is mobile relative to the other. Such dynamic or active line guide devices protect the lines from unintended stresses during movement, usually between a stationary connection and a mobile consumer, for example on a machine. They are typically displaceable to-and-fro linearly or in a movement plane along a longitudinal direction and typically form two substantially elongate runs and an approximately U-shaped deflection arc therebetween.

The invention also relates in general to a support chain for such a line guide device and to an individual chain link for such a support chain.

The invention specifically relates to a line guide device for cleanroom applications with a flexible envelope which has a number of receiving ducts arranged next to one another and extending in the longitudinal direction for enclosing supply lines so as to protect them from dust, each of which ducts typically receives at least one supply line. The envelope is in particular intended to prevent any material abraded from the lines, which is unavoidably formed during travel motion, from being released into the surroundings. In addition, an envelope made of a suitable material can improve abrasion behavior overall.

BACKGROUND

For stabilization or for longer lengths, use is made of what are known as support chains to support the line guide, in particular in the extended position of a self-supporting or unsupported run. To this end, the support chain, rather than a line, may be arranged in a receiving duct and assume extended positions to form the runs and an arcuate position to form a deflection arc, wherein the support chain also predetermines the desired radius.

Such a line guide device with support chains has been proposed, for example, in DE 10 2010 053 317 A1 and in DE 10 2011 015 119 A1. A generic support chain of this kind has a plurality of individual chain links, which are connected together in articulated manner, in each case with a first longitudinal portion in the longitudinal direction of the chain or of the individual link and a second longitudinal portion complementary thereto. The second longitudinal portion may here, similarly to a clevis plate, be bifurcated or forked with two side parts and therebetween a space, into which the first longitudinal portion of the following chain link is introduced and held at least against lateral transverse movement. The two longitudinal portions are suitably shaped to connect the chain links together in predetermined articulated manner, in particular such that a predetermined geometry of the deflection arc is maintained. The deflection arc is typically bent into an approximate U-shape about a deflection axis running transversely of the longitudinal direction, i.e. with a deflection axis parallel to the width direction.

Such support chains in particular ensure that a specific radius is maintained in the deflection arc, i.e. the lines are protected from kinking. In addition, the length is increased because the support chains enable greater self-supporting lengths, mainly of the upper run. So that such a support chain can be used instead of a line in the envelope, it typically has very compact dimensions, at least cross-sectionally, in particular in comparison with usual energy chains. A generic support chain itself, on the other hand, does not have a receiving duct for lines.

Depending on the load weight, for example two support chains are used laterally on the outside in an envelope. Multilayer structures, as proposed in DE 10 2012 100 359 A1, are also known in which more than two support chains are used in the envelope of a supporting layer, even including layers entirely without a line, i.e. with only support chains in the envelope of one layer.

In practice, it has been found that in many applications the support chains are more susceptible to wear than the guided lines. The support chains accordingly have to be replaced comparatively sooner. As a rule, the complete package is replaced, with all envelopes including all the lines and support chains guided therein, or at least all layers with support chains and associated lines. For practical reasons, in particular due to cleanroom requirements, replacing individual support chains in situ is usually undesirable. This does mean, however, that lines have to be replaced well before they reach their potential service life, i.e. prematurely, so giving rise to unnecessary costs. Maintenance intervals are also theoretically unnecessarily short in this respect.

SUMMARY

A core aim of the present invention is therefore to optimize the design of the support chain in relation to the known prior art, in particular to the effect that a longer service life of the support chain can be achieved. However, the intended particularly compact cross-section of the support chain should not be increased, or at most insignificantly so.

A plurality of aspects of the invention are proposed below which are to be regarded independently of one another as being of significance to the invention or as autonomous inventions. The individual design aspects can particularly advantageously be combined with one another.

The terms "inside" and "outside" and "on the inside" and "on the outside" are used hereinafter in relation to the deflection arc, i.e. inside in these terms means radially inside or facing the deflection axis and outside means radially outside or remote from the deflection axis. The terms "front" and "back" relate to two longitudinal ends of the individual chain link and are used merely by way abbreviation without making any statement about function and structure since the support chain is in principle always displaceable to-and-fro.

First Aspect

According to an independent first aspect, in the case of a generic line guide device or support chain, a solution is proposed for optimizing force transmission, in particular in an extended position.

According to the first aspect, optimization of force transmission is achieved in that the first, front longitudinal portion has a projection protruding on the inside and transversely of the longitudinal direction in an end region and in that the second, rear longitudinal portion has, on its internal side (inner side for short) relative to the deflection arc, an inside cross-bridge connecting the side parts and having an extended stop face for the extended position and a recess adjacent thereto at the front in the longitudinal direction. This makes it possible, when two joined chain links are in the extended position, for the projection of the one chain link to be gripped in the recess of the next or connected chain link and at the same time also at the front against the inside cross-bridge of the other chain link.

More favorable introduction of force is achieved overall through such engagement behind the cross-bridge or engagement of the one chain link in the next, according to the core concept of the first aspect, in particular against the cross-bridge connecting the side parts.

With regard to forces arising when the support chain is in the extended position and which are transferred from the one chain link to the other, in particular by the weight of the line or the intended load on the support chain, it is possible to achieve two effects.

On the one hand, according to the first aspect force is more favorably introduced thanks to the projection acting at the front on the cross-bridge on the other chain link (similar to an undercut) in that some of the otherwise arising surface pressure on the extended stop face is diverted into a tensile force, with which the projection acts on the cross-bridge in the longitudinal direction. With otherwise identical parameters, and a compact structural height in comparison with the structural length in particular also of the cross-bridge, greater self-supporting lengths can be achieved thereby. This also means, however, that an overall longer service life can be achieved for the support chain with an identical self-supporting length of the maximally advanced run. This effect is particularly advantageous with chain links which are made from a material, in particular plastics material, which deforms slightly under nominal loads.

On the other hand, according to the first aspect tensile forces can also be transmitted from one chain link to the next, with respect to the articulated connection of two connected chain links, without excessive loading of the articulated joint. In practice, the articulated joints may form the weak point of the support chain formation, which fails first. Synergistically with the former effect, service life can thus be further increased.

Furthermore, the interaction of projection and cross-bridge with the recess associated therewith optionally also allows a more favorable leverage effect in force transmission. Through the more favorable force introduction in the extended position, it is possible, while retaining the same compact construction, i.e. with a cross-section less than or equal to that of a receiving duct of a conventional envelope, to achieve a noticeable increase in the self-supporting length or service life of the support chain and/or to increase load-carrying capacity, such that overall fewer support chains are needed for a given application.

In one configuration of the first aspect, the first longitudinal portion may hook with its projection onto the corresponding second longitudinal portion of the next chain link, in particular in the manner of a hook or a retaining pawl or the like. The projection may hook into the recess of the second longitudinal portion or so to speak engage behind the cross-bridge. This "engagement behind" should proceed with maximally low wear, i.e. without undesired abrasion, on transition from the bent to the extended position. Latching of the projection to the other chain link is usually unnecessary or indeed undesirable.

In the support chain, the chain links are connected to form a strand and are intended to exhibit the proposed construction at least over the desired longitudinal portion which is intended to be self-supporting. The support chain preferably consists solely of such or identically constructed chain links, to allow the use of carry-over parts.

Particularly preferably, the second longitudinal portion has, on the outer side in the deflection arc, i.e. the outside thereof and in its rear end region, a transverse stop which lies opposite the outside of the first longitudinal portion of an adjacent chain link as an abutment for the extended position. Such an abutment enables "wedging" of the one longitudinal portion in the other. Through a corresponding abutment, partial to complete relief of the joint-forming regions can be achieved in the extended position by utilizing load-determined deformation in conjunction with the projection.

The outer transverse stop at the rear region may in this case be configured in particular as an outside cross-bridge connecting the side parts. In this way, a robust abutment is provided or the chain link becomes stabler or more rigid as a whole.

The chain links preferably have a design with a front or first and a rear or second longitudinal portion which are of mutually complementary configuration, such that the front longitudinal portion of a chain link can be connected with the rear longitudinal portion of the next chain link, in particular can be connected in articulated manner. In this case, at least one part of the front longitudinal portion of a chain link is mounted movably in the space of the rear longitudinal portion of the next chain link.

An articulated connection should in the present case be understood in general to mean a connection which the enables swiveling of two chain links relative to one another. In this case, a floating, loose articulated joint (non-locating bearing) falls within the context of the invention.

In one preferred embodiment, in particular of the first aspect, the projection may form a contact face, which serves to rest against a front end region of the cross-bridge and to this end is arranged substantially perpendicular to the longitudinal direction of the support chain or of the individual chain link. Force may be introduced particularly favorably, in particular with low wear and low abrasion, via a contact face oriented perpendicular to the longitudinal direction, i.e. also to the tensile force direction. With a contact face situated perpendicular to the longitudinal direction, a noticeable proportion of the forces arising through weight loading in the extended position may be introduced as a tensile force on the cross-bridge, so resulting in more favorable loading of the component. This is advantageous in particular if the cross-bridge exhibits shallow dimensioning, with a dimension in the longitudinal direction which is markedly greater than the structural height in cross-section perpendicular to the longitudinal direction, i.e. in conjunction with chain links of compact structure. It is however also conceivable to arrange the force-transmitting areas of projection and cross-bridge to be at least slightly inclined with regard to the longitudinal and heightwise direction of chain links or configured in rounded manner, e.g. for the optimization of abrasion edges.

In one practical embodiment, provision may be made for the first longitudinal portion to be of substantially lug-like configuration and at the same time exhibit a front end offset or projecting toward the inside (toward the axis of the deflection arc). At this end, the projection may be configured according to the first aspect. In this configuration, provision may be made for the first longitudinal portion further to form on its inside, for example in the central region, a recess in which the inside cross-bridge of the adjacent chain link may be partly inserted or wholly accommodated in the extended position. This enables a relatively slim configuration, in particular with low chain link structural height.

The first and second longitudinal portions typically have extended stop faces, i.e. faces which interact in pairs when the chain links are in the extended position and lie substantially parallel to the longitudinal direction. In this case, the projection and the inside cross-bridge preferably have interacting contact faces which lie substantially perpendicular to the extended stop faces. The contact faces may in this respect be arranged such that the projection of one chain link, in the extended position, rests or acts in force-transmitting manner with its contact face as extensively as possible against the contact face of the inside cross-bridge of the following chain link. This also results in favorable conditions for force transmission or introduction with a force component in the longitudinal direction of the chain.

It is advantageous in particular with regard to the first aspect of the invention for the projection and in particular the contact face thereof to extend over the entire width of the first longitudinal portion (when observed cross-sectionally perpendicular to the longitudinal direction). Furthermore, with advantageous dimensioning, the projection and in particular the contact face thereof may project inward (toward the deflection axis) with a protrusion of at least 5%, preferably of at least 10%, of the entire structural height of the chain link (when observed cross-sectionally perpendicular to the longitudinal direction). Comparatively large contact faces reduce the surface pressure between adjacent chain links.

For particularly favorable force transmission conditions, the projection may be arranged in the terminal front quarter of the first longitudinal portion. In this way, a leverage effect (with regard to the joint axis), may be further increased in particular in conjunction with an abutment, or particularly favorable force conditions may be achieved in the extended position. Accordingly, the inside cross-bridge is preferably arranged in the opposing or remote rear half of the second longitudinal portion. The recess here lies in the longitudinal direction between the cross-bridge and the terminal projection, i.e. closer to the central region of the chain link.

In a preferred further development, in particular of the first aspect, the recess at the front on the cross-bridge may form an opening toward the inside of the chain link which leads outward in particular from the space between the side regions. For instance, the full structural height of the cross-bridge may be used as a contact face for the tensile force-active projection.

Furthermore, provision may be made for the recess to accommodate the projection substantially completely in the extended position. In this case, form-fitting accommodation of the projection in the recess is advantageous, for example for stabilization in the transverse direction or for stabilization in the lateral direction.

The embodiments according to the first aspect are independent, but may be combined with the features of the following second and/or third aspects.

Second Aspect

According also to the second aspect, the construction of the chain links is optimized with regard to force transmission or service life, but in particular with regard to the limit stops in the arcuate position of the deflection arc. In the prior art support chains mentioned above, the chain links are plugged together transversely of the longitudinal direction, from the outside to the inside relative to the deflection arc. Depending on construction, these forked chain links therefore enable stabilization of the plate-type side regions on just one side, either radially on the inside or radially on the outside relative to the deflection arc.

On this basis, the second aspect of the invention proposes an altogether more robust configuration of the chain links. To this end, according to the core concept according to the independent second aspect of the invention, it is proposed in the case of a generic support chain that each chain link have in its second longitudinal portion an outside cross-connection on its outside (radially toward the outside in the deflection arc) in addition to an or the inside cross-connection provided on the inside.

The cross-connections may in particular be embodied as crosspieces and/or cross-bridges and are both preferably plate-like or of markedly lower structural height compared to structural length in the longitudinal direction.

The cross-connections span the space between the side regions and connect them in stabilizing manner. This configuration makes it possible for the inside cross-bridge to interact in the extended position with an inside extended stop face of the first longitudinal portion and further enables interaction of the outside crosspiece with an outside arc stop face of the first longitudinal portion, namely in the arcuate or deflected position in the deflection arc. Through the bilateral webs or bridges, force transmission between chain links or force introduction in the arcuate position (in the deflection arc) may thus also be improved, irrespective of whether a projection according to the first aspect is used.

The terms extended stop face or arc stop face here identify stop faces in accordance with their primary function (i.e. not according to their shaping), namely as active in the extended position or in the deflection arc.

Chain links with two opposing plate-type side regions, which act like clevis plates, already offer a degree of stability against lateral flexing of the support chain. The reinforcement of these side regions with two opposing cross-connections, such as a crosspiece and a cross-bridge, proposed according to the second aspect offers enhanced stability of the chain links against various types of deformation and in particular also markedly greater lateral stability when the support chain is in operation. This may be achieved in particular in the case of a cross-sectionally uniform compact structure with regard to external dimensions, for example with height×width≤50 mm×50 mm, in particular ≤25 mm×25 mm, wherein the cross-section does not have to be square.

In addition, using an arc stop face according to the second aspect may reduce abrasion or wear in comparison with known ways of constructing the arc stop, i.e. with comparatively narrow limit stops at the end faces.

A cross-bridge may be bounded on both sides in the longitudinal direction or front and back by cut-outs or orifices. A crosspiece may, on the other hand, merge preferably unilaterally, in particular at the front or toward the first longitudinal portion, into the trunk or body of the chain link or be molded thereon. The trunk or body of the chain link may here for example be embodied monolithically or as a solid body, and is preferably stabler per se than the side regions.

Preferably, a crosspiece is provided externally relative to the deflection arc, with a cross-bridge on the inside. This construction may be particularly advantageously combined with the first aspect.

The crosspiece is preferably arranged in a front part of the second longitudinal portion, i.e. on the side toward the first longitudinal portion. With support chains known from the prior art, with chain links pluggable together transversely of the longitudinal direction, an outside crosspiece according to the second aspect is structurally impossible.

Accordingly, one further development, in particular according to the second aspect, provides for the first longitudinal portion to be longitudinally insertable into the second longitudinal portion of a chain link to be connected, in particular in the direction toward the "front", in order to connect the chain links, for example also for articulated connection between two chain links.

In one preferred configuration of the second aspect, each chain link may further also have an outside cross-bridge in its second longitudinal portion on the outside, in addition to the crosspiece in a front region. Such an additional cross-bridge is in this case preferably arranged in a rear region. The chain link may also in each case comprise a first and a second outside cross-bridge, in particular instead of a crosspiece on the outside.

The additional cross-bridge likewise has a reinforcing action and is preferably provided in the rear end region of the second longitudinal portion. A corresponding cross-bridge on the outside at the rear end region of the second longitudinal portion may additionally particularly advantageously be used in conjunction with the first aspect, namely as an abutment for force introduction via the projection (see above).

In addition, the first longitudinal portion may have a protruding region on the outside, which region, in the arcuate position (in the deflection arc) reaches or engages on the outside in between the crosspiece and the cross-bridge or both outside cross-bridges. This configuration makes it possible, for example, for the first longitudinal portion to be wedged together with the second longitudinal portion in the arcuate position and to this end to be jammed together in particular with one edge of the protruding region. This may in particular be achieved by acting on the further or rear outside cross-bridge. This makes it possible to prevent, in the event of loading in the traction direction (one direction of travel), inter alia unintentional detachment of the chain links in the arcuate position, in particular in the case of comparatively high tensile forces.

It is in principle advantageous, for each of the described aspects, for the complementary longitudinal portions of successive chain links to be able to form a latched connection which reliably prevents detachment in the longitudinal direction in the event of intended tensile forces.

To this end, in one of the two longitudinal portions, each chain link may in each case exhibit two opposing pins or latching pins projecting laterally relative to the longitudinal direction, wherein corresponding cut-outs are provided on the corresponding longitudinal portion, with which the lateral pins may be latched together. The pins are advantageously provided on the first longitudinal portion, such that they may engage in cut-outs on the side parts of the second longitudinal portion without in the process protruding laterally beyond the side parts.

To connect the chain links in the longitudinal direction of the chain, it is advantageous for the latching pins to have longitudinally obliquely tapering insertion bevels, in particular insertion bevels tapering longitudinally from back to front (or in the insertion direction). Corresponding insertion bevels simplify assembly of the chain through simple plugging together of the chain links in the longitudinal direction of the chain.

In particular in the case of a stabilized construction of the second longitudinal portion with opposing cross-bridges or crosspieces, it is furthermore advantageous for the cut-outs, which are provided with the above-stated latching pins for latching purposes, to be associated with insertion grooves which open into the cut-outs. Such insertion grooves make it easier for the pins to be introduced into the cut-outs. When it comes to plugging the chain links together in the longitudinal direction, it is advantageous for the insertion grooves to extend substantially in the longitudinal direction.

Third Aspect

According to an independent third aspect, a novel, optimized configuration of the articulated joint between the individual chain links of the support chain is proposed.

With a generic chain link or a support chain with a front longitudinal portion and a rear longitudinal portion, two side regions of the broader or rear longitudinal portion in each case have a front end face and a rear end face, which lie opposite one another in the case of adjacent chain links.

In such a configuration, it is proposed according to the core concept of the independent third aspect, that the front end face form one joint region and the rear end face a complementary joint region, wherein the joint regions interact depending on load case, in particular at least in the event of shear loading (in one direction of movement, here "forward"), in order to bring about a desired articulated connection between the two chain links. In this case, the respective joint regions of the front end face of a chain link and of the rear end face of an adjacent or next chain link interact.

This opens up new, optimized configuration options in comparison with conventional joint pins and joint receptacles for swivelable connection of chain links, and in particular more favorable force transmission conditions or a longer service life for the articulated joint. This configuration makes it possible, on the one hand, to ensure that the front end face of the one chain link may rest against the rear end face of the adjacent other chain link for shearing force transmission. On the other hand, at the same time the end regions of the side parts may themselves be used as joint regions for articulated connection of two chain links, such that the conventional, wear-susceptible articulated joint with hinge pin/receptacle can be dispensed with. The end faces offer a comparatively large area dimension for configuration purposes, such that the surface pressure in the event of the introduction of shearing force or the durability of the joint may be increased.

The joint regions may in this case be embodied in the manner of a non-locating or floating bearing, which forms a defined bearing or transmits force only in the direction of the shearing force loading, in particular defines a swivel axis or axis of rotation for swiveling the two chain links only in the event of shear loading of the support chain. The joint regions may, as a tribological pairing, in particular form a floating tilting bearing, wherein for example the joint regions of the front end faces of the one chain link may be embodied as a convex pressure piece, for example with surfaces in the form of cylinder portions, and the rear end faces of the other chain link may be embodied as an interacting concave tilting support with complementary surface.

Preferably, the joint regions transmit substantially no tensile forces when the support chain is in operation.

An articulated joint of the non-locating bearing type is per se longer-lasting and particularly advantageously combinable with the first aspect. It allows relative displacement in the heightwise or displacement of the pivot point, in particular under weight loading in the extended position, in order to optimize more favorable introduction of force according to the first aspect.

In the case of an articulated joint using end faces, the first longitudinal portion of the one chain link may be held, in particular held in latched manner, in the complementary second longitudinal portion of the next chain link in the longitudinal direction optionally with a degree of play in the longitudinal direction. The third aspect enables a configuration of the articulated joint which is independent of the connection for the transfer of tensile force, e.g. by latched connection and/or a hook-type engagement according to the first aspect.

According to the independent core concept of the third aspect, it is thus proposed for the usually plate-type side regions which are in any event present in a longitudinal portion to provide the articulated joint at their end faces or for parts of the end faces to form integral components of the articulated joint.

This third aspect of the invention makes it possible, for example, to provide articulated joints with comparatively low abrasion of the region serving as pivot bearing, without notable additional materials cost and without complicating the connection of the articulated joint on latching together of the chain links. Furthermore, this configuration allows a comparatively smaller or longitudinally shorter chain pitch of the support chain as compared with the prior art, and thus inter alia also smaller bending radii of the deflection arc or lower structural heights of the line guide as a whole.

In one particular embodiment of the third aspect, the front end face is convexly shaped and the rear end face is accordingly or conjugately concavely shaped, in each case when viewed in a plane parallel to the displacement plane (in side view of the chain link).

The joint regions on the end faces are preferably embodied for a swivelable articulated connection which predetermines a defined pivot point (revolute joint or tilting joint) on shear loading, for the purpose of swiveling in the curved relative position of the deflection arc. The swivel axis here lies, as is conventional, preferably perpendicular to the longitudinal direction and to the movement plane of the support chain.

Rolling of the joint regions along one another is however also conceivable. The joint regions of the end faces may be embodied for a revolute joint connection or a hinge joint, for example in manner of a joint head/joint socket connection. A configuration as a floating, non-locating bearing is preferable, on the other hand.

Particularly preferably, the front and rear end faces in each case form a contact face preferably adjoining the joint region on both sides in the heightwise direction, namely one toward the inside for the arcuate position (arc contact face) and one toward the outside for the extended position (extended contact face). It is also already advantageous to provide a limit stop-active face, in particular an extended contact face, on only one side of the joint region, on the opposing end faces.

In one preferred embodiment, each of the end faces forms three functional regions subdivided in the heightwise direction: an extended contact face, the joint region and an arc contact face. The extended contact face of a front end face interacts with the extended contact face of a rear end face in the extended position, in particular in the self-supporting run. The arc contact face of a front end face interacts with the arc contact face of a rear end face in the deflection arc (arcuate position). Accordingly, the opposing extended contact faces and the opposing arc contact faces of the end faces are shaped conjugately to one another.

In this case, the contact faces of the end faces may preferably be contact faces which extend curved in side view, whereby inter alia noise generation is reduced. They may for example each run in arc of a circle-shaped manner with a comparatively large radius, for example >50% of the chain pitch or greater by a multiple than the structural height of the chain link. The radius of the two arcs of a circle may be identical, but with the center points not coinciding.

The convex and concave joint regions may for example be embodied as circular cylindrical surfaces of comparatively small radius, in particular <33% of the structural height of the chain link. Alternatively, the third aspect also allows configurations with large radii, which cannot be implemented with conventional pin/receptacle articulated joints.

As a particular feature of the third aspect, it is likewise advantageous for the chain links to be connected together by plugging together in the longitudinal direction. This may be achieved in that the first longitudinal portion in the longitudinal direction can be inserted into the complementary second longitudinal portion of a chain link to be connected, in particular in the longitudinal direction, wherein the longitudinal portions are preferably embodied to form a latched connection against detachment in the longitudinal direction.

In a preferred embodiment for latching purposes, in particular in connection with the third aspect, specific latching pins may be provided which do not serve as actual joint pins. To this end, in two opposing pins protruding laterally relative to the longitudinal direction, which however preferably have a particular shaping for a specific receptacle, may accordingly be provided in the one portion. The laterally protruding pins are latchable together with a corresponding cut-out in the other longitudinal portion. A particular preferred configuration is one in which the cut-outs run in arc of a circle-shaped manner in a longitudinal plane (corresponding to the movement plane of the support chain). In this case, the arc of a circle shape corresponds to the desired articulated joint, in particular through the end faces of the side regions according to the third aspect. The center point of the arc of a circle should correspond to the nominal pivot point of the articulated joint and the radian measure should correspond at least to the desired swivel angle, preferably with play for relative heightwise displacement of the two chain links.

The cut-outs for the pins are preferably provided in the side regions, in particular at the inner face facing the internal space. The pins used for the latched connection may snap into the corresponding arc of a circle-shaped receptacles. The receptacles may be molded into the side regions as through-orifices or for example as inner grooves.

In all aspects, the two-armed longitudinal portion with the two side regions may be bifurcated, forked or in general similar to a clevis plate. The preferably tongue-like first longitudinal portion may in this case constitute a male coupling piece, which is received and held in the space in the complementary female coupling piece. In principle, the space is in this case dimensioned such that at least the front part, in particular a predominant part of the first longitudinal portion of a connected chain link is herein swivelably mobile relative to the chain in the longitudinal plane. Between the end regions of the longitudinal portions, a central, comparatively robust middle portion in the manner of a trunk can be provided, which may be considered part of the second longitudinal portion.

The invention further relates to a chain link taken alone, which includes the features according to one of the above-described embodiments, i.e. according to the first, second and/or third aspect or according to one of the preferred further developments.

The chain link for the support chain is in all aspects preferably produced in one piece from plastics material, in particular using the injection molding method. To this end, in particular, fiber-reinforced thermoplastics or other suitable polymers may be used. All the chain links are preferably of like construction or have identical geometry.

With the configurations according to one or more of the above aspects, it is in each case possible, mutually independently, to achieve a noticeable improvement of the support chain as whole, in particular with regard to the service life thereof.

The construction of the envelope is not in principle critical, but for cleanroom applications it should surround the lines guided therein and also the support chains accommodated where needed in a circumferentially closed manner and in a manner which is dust-tight or protects against the escape of abraded particles. The device may optionally include a plurality of layers of such envelopes, wherein at least one support chain is accommodated in one envelope.

BRIEF DESCRIPTION OF THE DRAWINGS

Further details and advantages of the individual aspects of the invention may be inferred, without restricting the general nature of the above, from the following explanation of preferred exemplary embodiments on the basis of the appended drawings. Features of corresponding or identical structure or function have corresponding reference signs and may not be repeatedly described. In the figures.

DETAILED DESCRIPTION

Figure 1:
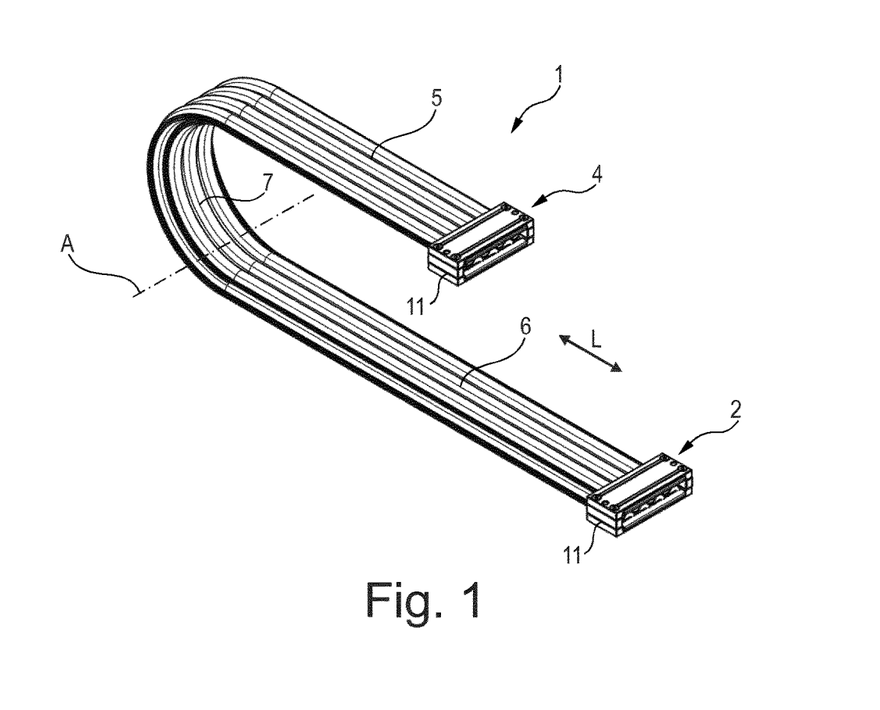
FIG. 1: is a perspective view of a line guide device for cleanroom applications, here with two envelopes, in a purely exemplary operating position with an extended self-supporting upper run, an extended resting lower run and a deflection arc therebetween.

FIG. 1 shows an exemplary line guide device 1 which guides supply lines 3 (FIG. 2) between a stationary connection point 2 on a base and a mobile connection point 4 on a moving end. The moving end is not shown in any greater detail and can typically be displaced to-and-fro in linear manner in the longitudinal direction L. The supply lines 3 are cables, hoses or the like and supply the mobile part of a machine for example with power, signals and/or operating media. FIG. 1 shows a snapshot of the line guide assembly 1 with a self-supporting, extended upper run 5, a lower run 6 optionally lying on a bearing surface and a deflection arc 7. The deflection arc 7 has a predetermined bending radius or deflection radius about a notional deflection axis A. When in operation, the deflection arc 7 travels to-and-fro relative to the stationary connection point 2 when the upper run 1 with the mobile connection point 4 travels forward or backward in the longitudinal direction.

The line guide device 1 is suitable and intended in particular for cleanrooms or other fields of applications in which the release of particles must be reduced or prevented. To this end, it has one or more flexible envelopes 10 of flexible plastics material extended in the longitudinal direction L, which envelopes enclose the supply lines 3 in dust-tight manner along their entire length between the connection points 2 and 4. The ends of each envelope 10 and of the lines 3 are fastened at the end to the connection points 2, 4, for example using clamping devices 11 or end connections.

Figure 2:
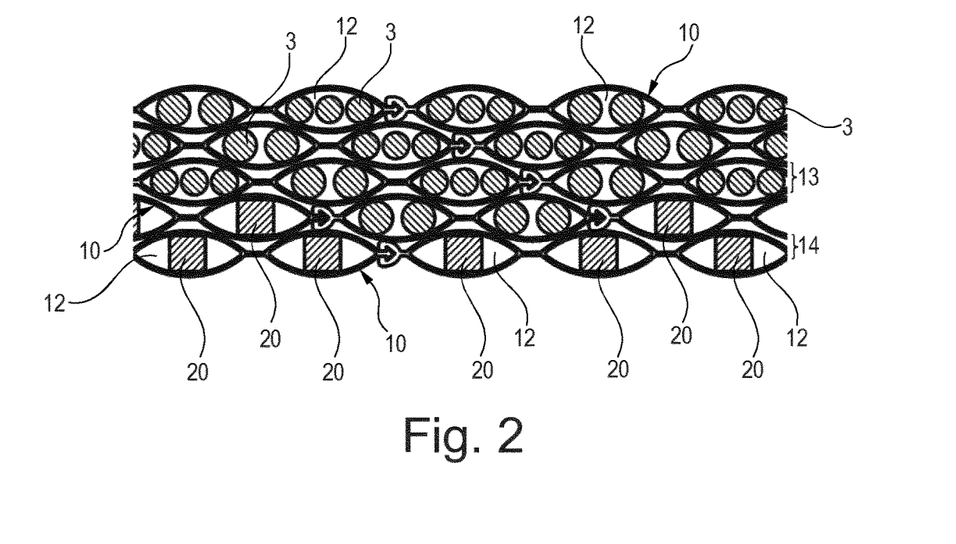
FIG. 2: shows a cross-section (perpendicular to the longitudinal direction) of an exemplary multilayer structure with a number of stacked envelopes for a plurality of lines, wherein support chains are accommodated in the receiving ducts of a number of envelopes.

According to FIG. 2, each envelope 10 has a number of tube-shaped receiving ducts 12 for guiding in each case at least one or more supply lines 3. Each envelope 10 is hose-like overall and sufficiently flexible, inter alia through suitable design and/or material selection, to allow reversibly flexible curvature of the deflection arc 7 with little application of force and to follow the movement in the longitudinal direction L with the least possible resistance.

The line guide device 1 further includes a number of support chains 20 which extend along the entire length of the line guide device 1 from connection point 2 to connection point 4. In the purely exemplary arrangement according to FIG. 2, a multilayer structure is shown with a plurality of stacked layers 13 of envelopes 10 with lines 3. In this respect, an inner support layer 14 facing the deflection arc 7 is provided, in which support chains 20 are provided in all the receiving ducts 12 of the envelope(s), i.e. this inner support layer 14 does not guide any lines 3. Additional support chains 20 may also be arranged in the envelope(s) 10 in further layers 13, e.g. on the outer sides, for the purpose of stabilization against transverse forces, cf. FIG. 2.

A core function of the support chains 20 consists in predetermining the radius of curvature of the deflection arc 7 or limiting the minimum radius thereof about the deflection axis A. A further core function of each support chain 20 consists in supporting or indeed enabling the self-supporting length of the upper run 5, in particular in the fully advanced position of the moving end (not shown in FIG. 1). Each support chain 20 in this case supports the envelope 10, in particular against gravity-induced sagging, or has a load-bearing action. A sufficient number of support chains 20 is provided for the load weight and length.

The support chain 20 takes the form of a link chain and is explained in greater detail below with reference to two exemplary embodiments of the individual chain links.

FIGS. 3-7 show a preferred first embodiment of a chain link 100 which combines all three core aspects of the invention. The chain link 100 has, when viewed in the longitudinal direction L, a front or first longitudinal portion 101 and a rear or second longitudinal portion 102 of complementary configuration thereto. The chain link 100 furthermore has two side parts 102A, 102B which are configured in the manner of clevis plates and form a space 103 therebetween. The first longitudinal portion 101, embodied as a male connector, of an adjacent following chain link 100 can be inserted into the space 103 and largely accommodated therein, cf. FIGS. 5A-5B. The second longitudinal portion 102 forms with the space 103 a corresponding female connector. Each chain link 100 is a one-piece injection molding of durable, flexurally rigid plastics material. At the transition to the shorter first longitudinal portion 101, the extended second longitudinal portion 102 forms a reinforced trunk region 104, which may be embodied as a solid body or with weight-reducing cut-outs, and bounds or closes off the space in the longitudinal direction L, cf. FIG. 4B.

Figure 3:
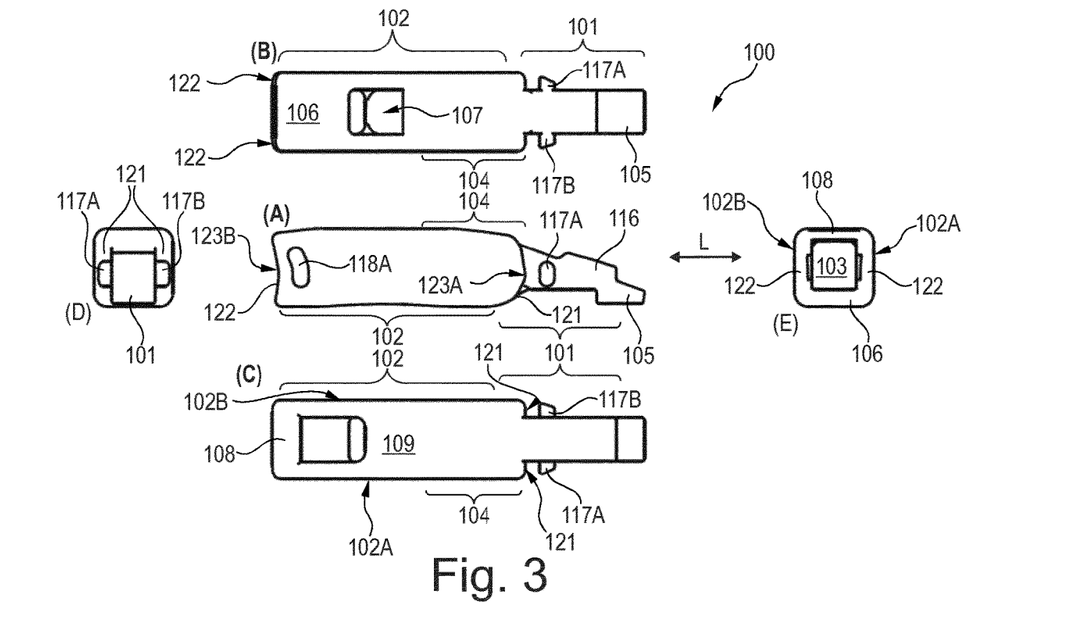
FIG. 3: shows structural views of an individual chain link for a support chain according to a first exemplary embodiment in side view (A), view from below (B), plan view (C), front view (D) and rear view (E)

The chain link 100 is approximately square in cross-section (perpendicular to the longitudinal direction), cf. rear view FIG. 3(E), with compact dimensions, preferably with a width of ≤25 mm×height≤25 mm. The length amounts to a multiple of the height or width, but should be as short as possible for small radii of the deflection arc 7, for example in the region of 4 times to at most 10 times the structural height.

Figures 4A, 4B:
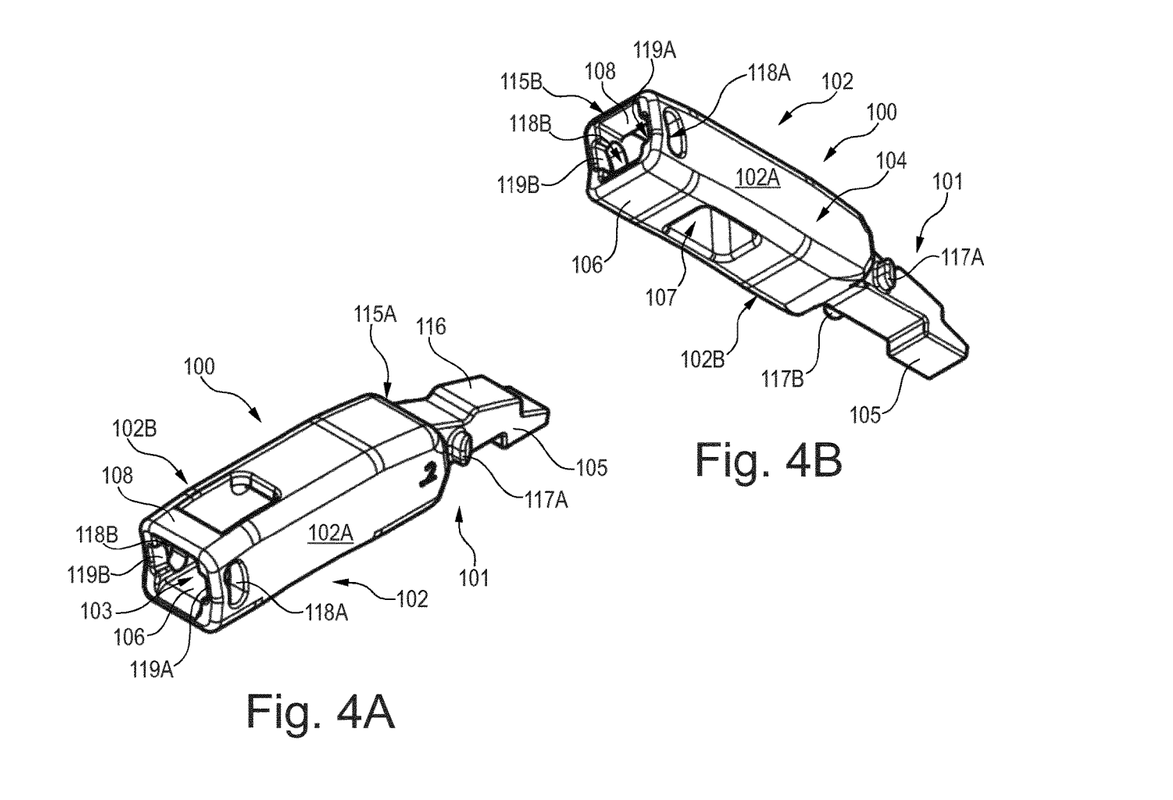
FIGS. 4A-4B: show perspective views of the chain link according to FIG. 3.
Figures 5A, 5B:
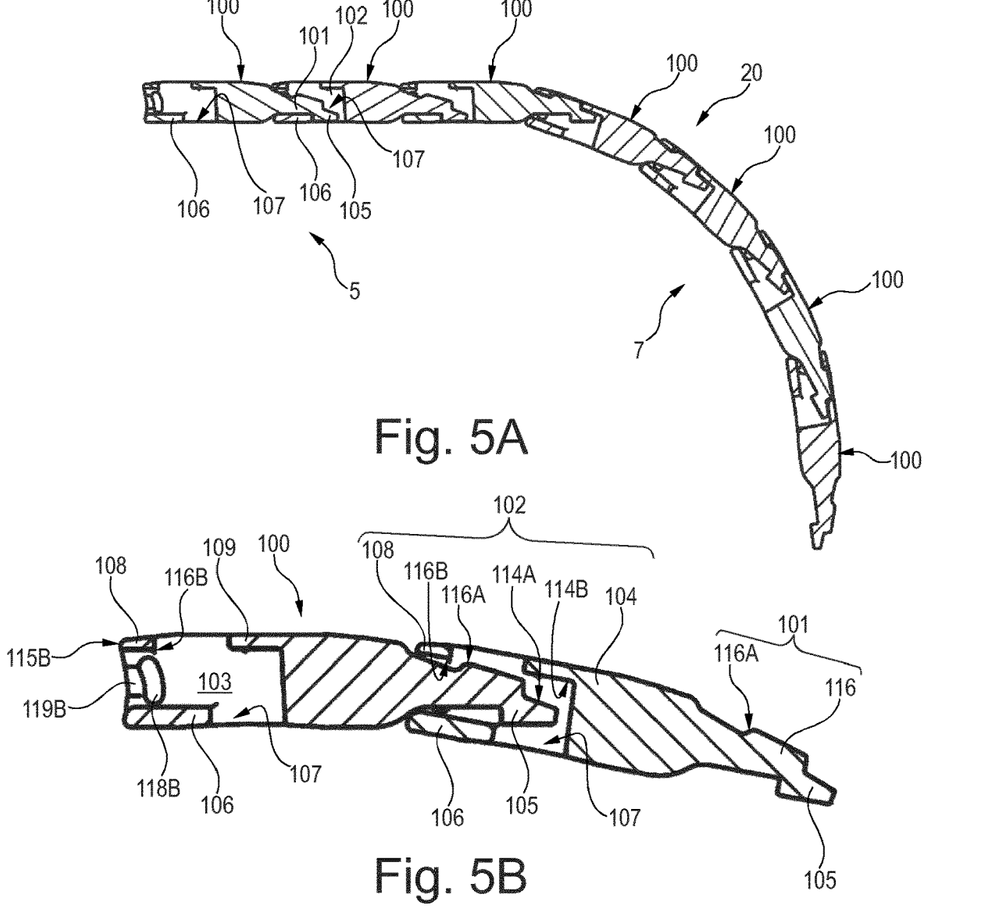
FIGS. 5A-5B: show longitudinal sections through the central plane of a sub-length of a support chain of chain links according to FIG. 3, in the extended position (left in FIG. 5A) and fully bent arcuate position (right in FIG. 5A) in the deflection arc and with an only partly bent intermediate position between two chain links (FIG. 5B)

FIG. 3(C) is a plan view of the outside of the chain link 100 remote from the deflection axis A, cf. also FIG. 5A. FIG. 3(A) is a view from below of the inside of the chain link 100 facing the deflection axis A. On the inside thereof, the male longitudinal portion 101 has a projection 105 in the front end region protruding transversely of the longitudinal direction L, as is shown most clearly in FIG. 4B. The projection 105, which here is roughly cuboidal or plate-like, is approximately flush with the inside of the other longitudinal portion 102 or the side parts 102A, 102B.

Likewise on the inside, the female longitudinal portion 102 has a plate-like cross-bridge 106 at the rear end region, which cross-bridge runs perpendicular to the longitudinal direction L and connects the side parts 102A, 102B in stabilizing manner. The cross-bridge 106 has roughly the wall thickness of the side parts 102A, 102B, e.g. roughly 10-25% of the height or width. In the longitudinal direction toward the front end region 101, the cross-bridge 106 bounds on the inside a recess 107, which here is a through-recess, i.e. opens to the outside from the space 103. Furthermore, FIGS. 3-4 show a further, outside cross-bridge 108 at the rear end region of the longitudinal portion 102. The two cross-bridges 106, 108 connect and stabilize the side parts 102A, 102B into a cross-sectionally box-shaped or circumferentially closed structure (cf. FIG. 3(E)) and in particular counteract unintended spreading of the side parts 102A, 102B at the rear end of the longitudinal portion 102.

As FIG. 5A (left) illustrates, the projection 105 of one chain link 100 engages in each case in the recess 107 of the chain link 100 connected or following in the chain strand and in the process may act at the front on the inside cross-bridge 106 thereof, in order, according to the first aspect of the invention, to transfer or introduce a tensile force. This effect is explained in greater detail with reference to FIGS. 7A-7B.

Figure 7A:
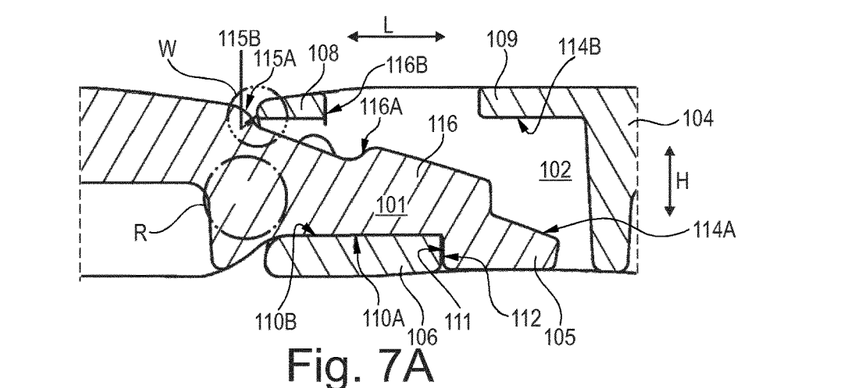
FIG. 7A: shows an enlarged longitudinal section of the connection regions of two chain links in the extended position similar to FIG. 5A to illustrate the introduction of force.

In the extended relative position of two connected chain links 100, as shown in FIG. 7A, the tongue-like first end region 101 bears with a first extended stop face 110A facing the deflection axis A extensively and in force-transmitting manner on an opposing extended stop face 110B of the cross-bridge 106 of the second end region 102. In this way, in the extended state, in particular in the self-supporting part of the upper run 5 (FIG. 1), some of the load may be transmitted between the chain links 100 or absorbed by the support chain 20. The extended stop faces 110A, 110B active in the extended position here lie substantially parallel to the longitudinal direction L.

According to the first aspect, improved force introduction is achieved in that the projection 105 interacts via a contact face 111 substantially perpendicular in the longitudinal direction L with an associated mating face 112 of the cross-bridge 106, in particular in the tensile force direction. Through action of the contact face 111 of the projection 105 on the mating face 112 of the cross-bridge 106, in the extended position a proportion of the load, in particular weight load, is introduced into the cross-bridge 106 as a force parallel to the longitudinal direction L and in the direction of a tensile force. This corresponds, as FIGS. 3-4 or FIG. 7A show, to the direction in which the cross-bridge 106 has distinctly greater dimensions and flexural rigidity than in the heightwise direction H, without having to the increase the structural size thereof. Thus, a markedly more robust or longer-lasting support chain 20 is achieved for equally compact external dimensions.

This advantageous effect according to the first aspect may be enhanced to a greater extent by the pivot point of the articulated joint indicated schematically with R in FIG. 7A being displaced outward (away from the deflection axis A), namely if the chain links 100, in particular the tongue-like first longitudinal portion 101, deform under heavy loads. Such deformation is enabled, as intended, by suitable dimensioning, in particular of the first end region 101, until a corresponding shoulder or active area 115A on the outside, in particular at the transition between the first longitudinal portion 101 and the second longitudinal portion 102, strikes against an abutment area 115B of the opposing, outside cross-bridge 108, as illustrated in the region in FIG. 7A designated schematically with W. When the active area 115A strikes against the cross-bridge 108 in this region W (not shown in FIG. 7), the cross-bridge 108 thus forms an abutment. This results in a lever effect, which proportionally increases the more favorable introduction of force via the contact face 111 of the projection 105 and assigned contact face or mating face 112 of the cross-bridge 106 and thus proportionally or largely relieves the surface pressure between the extended stop faces 110A, 110B. The lever length is defined by the maximally terminal arrangement of the projection 105 and its contact face 111 on the first longitudinal portion 101. The projection 105 is for this purpose arranged in the front, terminal quarter of the first longitudinal portion 101 and the internal cross-bridge 106 is preferably arranged in the remote rear half of the second longitudinal portion 102, as shown in FIG. 3 or FIG. 7A.

The lever effect may be optimized by a suitable loose or floating articulated joint (cf. third aspect) or an articulated joint with play in the heightwise direction H. Introduction of the load via the contact faces 111, 112 may extend up to a predominant proportion.

The first longitudinal portion 101 is embodied with a smaller cross-section than the space 103 in the second longitudinal portion 102, as a comparison of FIG. 3(D) with FIG. 3(E) shows. The first longitudinal portion 101 is swivelable in the space with little play and without abrasion edges in the longitudinal and heightwise plane L-H and in this plane is more readily deformably dimensioned than the box-shapedly reinforced second longitudinal portion 102, in order to allow interaction of the active areas 115A, 115B.

A further decisive advantage of the interaction of projection 105 and cross-bridge 106 lies in the transfer of tensile forces in the extended position of the upper run 5, i.e. on advance of the moving end, which, as a result of the proposed design, are able to flow predominantly or completely over the contact faces 111, 112 and the cross-bridge 106. Accordingly, the articulated joint, which often constitutes a weak spot with regard to fatigue fracture, can, irrespective of its construction, be largely relieved of tensile forces. The load cycling amplitude at the articulated joint may accordingly be markedly reduced, which likewise increases service life.

For a design which is robust with regard to force transmission, the projection 105 is embodied with its contact face 111 in such a way that it extends over the entire width of the first longitudinal portion 101 (cross-sectionally relative to the longitudinal direction L), as shown in FIG. 3(B) and FIG. 3(C). Both may project with a protrusion of around 10% of the height of the chain link 100 (dimensions in heightwise direction H). In this way, a comparatively large-area contact face 111 is achieved, with a simultaneously compact construction of the chain link 100. For compact construction, the recess 107 is embodied as an opening starting from the space 103 toward the inside. The recess 107 may form-fittingly accommodate the projection 105 in the extended position in order to bring about additional lateral stability of the deflection arc 7.

To delimit the relative swivel angle in the arcuate relative position of the chain links 100 in the deflection arc, the chain links 100 have interacting arc stop faces 114A, 114B, as is most clearly apparent from a comparison of FIG. 5A with FIG. 5B.

At the outer side, remote from the projection 105, of the first longitudinal portion 101, a first arc stop face 114A is provided, which, in the fully bent position (FIG. 5A, right) interacts with an opposing second arc stop face 114B. This second arc stop face 114B is, according to a second aspect of the invention, provided on an additional crosspiece 109 and faces the space 103. The crosspiece 109 connects the side parts 102A, 102B in a stabilizing manner, similar to the cross-bridge 108, and additionally transitions in one piece into the trunk region 104 and is thus reinforced thereby against twisting. This results in elevated stability of the limit stops in the arcuately curved relative position of the chain links 100 in the deflection arc 7. Thanks to the further crosspieces 109 and resistant arc stop faces 114B formed thereon, according to the second aspect of the invention a comparatively high load-bearing capacity of the deflection arc 7 of the support chain is achieved, which is advantageous inter alia for long self-supporting lengths.

Furthermore, the first longitudinal portion 101 on the outside has a protruding region 116, which engages in the arcuate position (FIG. 5A, right) in a further cut-out between the crosspiece 109 and the cross-bridge 108. In this way, the tongue-shaped first longitudinal portion 101 may wedge together with the second longitudinal portion 102 of the next chain link in the arcuate position, in that a further active area 116A provided on the protruding region 116 acts on or wedges together with a further abutment area of the outer cross-bridge 108, as illustrated in FIG. 5A. In this way, the support chain 20 transmits tensile force also in the deflection arc 7 or in the case of fully bent chain links 100, i.e. if the projection 105 is not positioned in the extended position in such a way as to transmit tensile force. Thus, in this position too, no or a markedly reduced tensile force is transmitted via the articulated joint. The protruding region 116 additionally forms a reinforcement of the front end region of the longitudinal portion 101 with the projection 105, cf. FIG. 7A.

The proposed construction with opposing cross-bridges 106, 108 and the crosspiece 109 is enabled inter alia in that the chain links 100 are connected to one another by being plugged together substantially in the longitudinal direction L, as is apparent from FIGS. 5A-5B. The first longitudinal portion 101 is embodied in the manner of a tongue-shaped tip, which can be inserted in the longitudinal direction L into the space 103 in the second longitudinal portion 102 of an adjacent following chain link 100.

In order to enable transfer of tensile forces in particular even in intermediate positions between the fully bent arc position in the deflection arc 7 and the extended position in the upper run 5, the longitudinal portions 101, 102 are embodied to form a latched connection, which secures against detachment in the longitudinal direction L in intermediate positions (FIG. 5B) under nominal tensile loads. To this end, each chain link 100 has, in the one longitudinal portion 101, two opposing latching pins 117A, 117B projecting laterally relative to the longitudinal direction and which end laterally roughly flush with the side parts 102A, 102B. Each latching pin 117A, 117B is latchable together with a corresponding latching cut-out 118A, 118B in the other longitudinal portion 102. The latching cut-outs 118A, 118B are provided in the rear region of the side parts 102A, 102B on the side of the space 103, here as openings in the side parts 102A, 102B. Since the chain links 100 are plugged together in the longitudinal direction L, the latching pins 117A, 117B have insertion bevels tapering obliquely in the longitudinal direction L toward the tip of the first end region 101, as shown in FIG. 3(B) and FIG. 3(C). Furthermore, to simplify plugging together, each chain link 100 has insertion grooves 119A, 119B for the latching pins 117A, 117B. The insertion grooves 119A, 119B lead from the insertion orifice at the rear end of the end region 102 into the cut-outs 118A, 118B and are oriented substantially in the longitudinal direction L.

Figure 6:
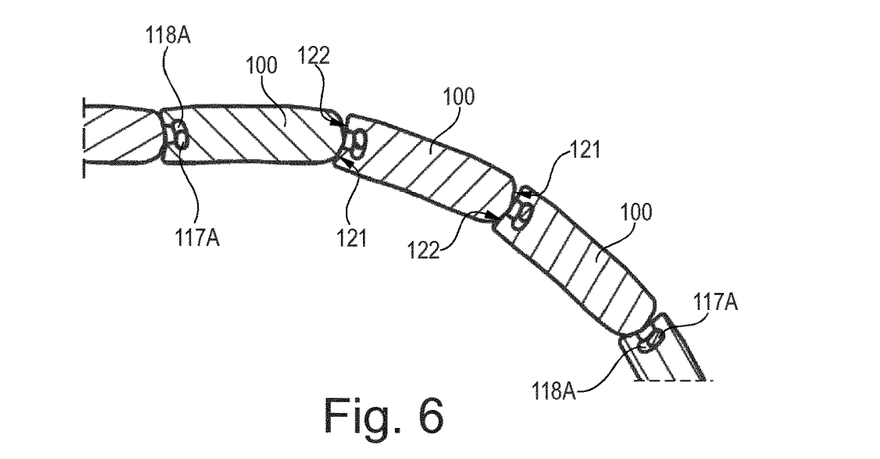
FIG. 6: shows a partial longitudinal section in the arcuate position similar to FIG. 5A, in a laterally outer region to illustrate the latched connection and articulated joint between chain links.
Figure 7B:
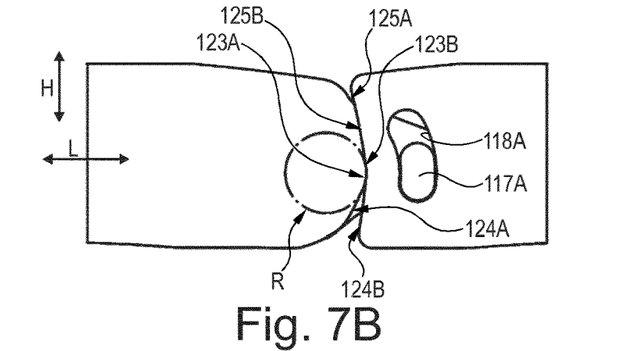
FIG. 7B: shows an enlarged side view of the connection regions of two chain links in the extended position to illustrate a preferred floating articulated joint.

Looking at FIG. 6 and FIG. 7B in combination with FIGS. 3-4 reveals the transfer of shearing forces in this preferred exemplary embodiment. The two side regions 102A, 102B of the second longitudinal portion 102 each have a front end face 121 and a rear end face 122, which lie opposite one another in the case of adjacent chain links 100 and strike against one another under shearing force on the upper run 5 or the deflection arc 7, as is most clearly apparent from the longitudinal section through the side parts 102A in FIG. 6. In the process, the striking end faces 121, 122 transfer the shearing force from one chain link 100 to the next. The tongue-shaped first longitudinal portion 101 and the latched connection using latching pins 117A, 117B and corresponding latching cut-outs 118A, 118B are preferably dimensioned with sufficient play in the longitudinal direction L for no shearing forces to be transferred via them.

In addition to the shaping of the interacting end faces 121, 122, FIG. 7B further illustrates a third, independent aspect of the invention, according to which the end faces 121, 122 of the two side parts 102A, 102B also form the articulated joint in a type of floating (non-locating) bearing in the form of a tilting bearing. To this end, a joint region 123A at the front end face 121 is of convex configuration and an interacting joint region 123B of the rear end face 122 is of conjugately concave configuration. The joint regions 123A, 123B may in particular be embodied as circular cylindrical surfaces with a radius indicated schematically by the dashed circle region R in FIG. 7B, wherein larger or smaller radii are also possible. The tilting bearing formed by the joint regions 123A, 123B specifies a defined axis of rotation perpendicular to the L-H plane (plane of FIG. 7B) under shear load at least in the extended position and at a small angle relative thereto. A significant advantage of this configuration lies in the fact that the floating joint does not transmit any tensile force and cannot be overloaded thereby. In addition, a degree of freedom is provided in heightwise direction H, which is advantageous particularly in combination with the optimized force introduction according to the first aspect (cf. FIG. 7A). Irrespective of this, the loose articulated joint formed by the end faces 121, 122 also offers advantages with regard to design latitude and surface pressure or introduction of shearing force.

As is moreover shown most clearly in FIG. 7B, the cut-outs 118A, 118B run in the longitudinal and heightwise plane L-H in arc of a circle-shaped manner in the side regions 102A, 102B in accordance with the pivot point of the joint regions 123A, 123B. The latching pins 117A, 117B may likewise be of elongately curved configuration and run in the arc of a circle-shaped receptacles 118A, 118B as in a slotted guide or curvilinear guide.

Furthermore, in the heightwise direction, the end faces 121, 122 form curved contact faces in each case adjoining the joint region 123A, 123B thereof on both sides, namely for the arcuate or extended positions. Each end face 121, 122 is subdivided in the heightwise direction H into three functional regions: an extended contact face 125A or 125B respectively, the joint region 123A or 123B respectively and an arc contact face 124A or 124B respectively. The extended contact faces 125A, 125B interact in the extended position, cf. FIG. 7B, in particular in the self-supporting run 5. In contrast, the arc contact faces 124A, 124B interact in the deflection arc 7 (arcuate position). Accordingly, the opposing arc contact faces 124A, 124B and extended contact faces 125A, 125B are formed to match one another in conjugate manner, here curved roughly in arc of a circle-shaped manner with a comparatively large radius, markedly larger than the joint regions 123A, 123B, but with center points which do not coincide.

Figure 8:
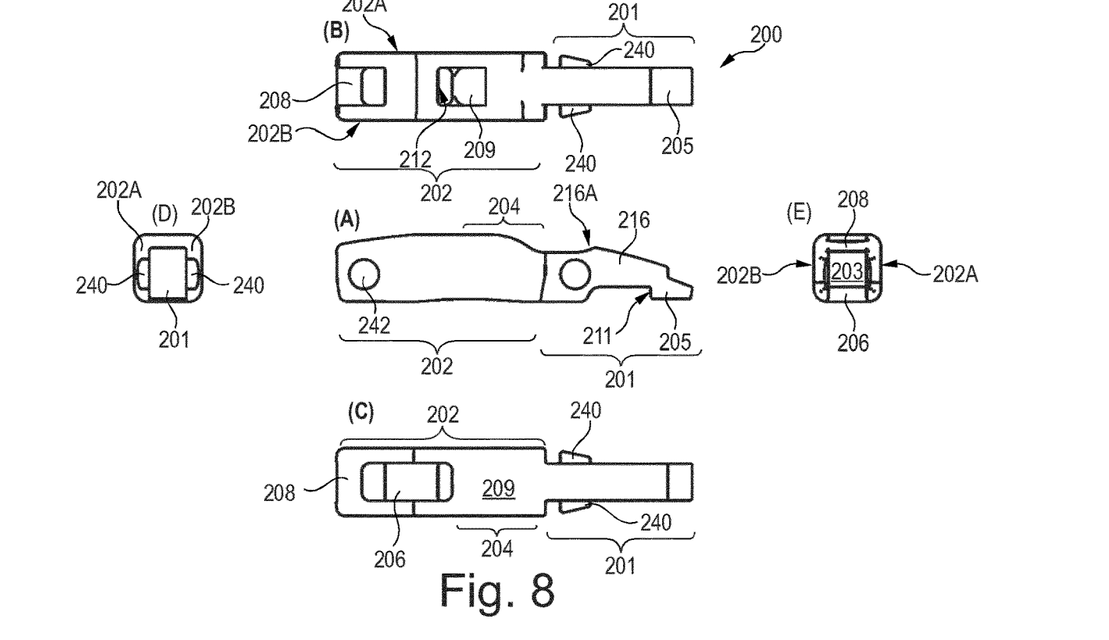
FIG. 8: shows structural views of an individual chain link according to a second exemplary embodiment in side view (A), view from below (B), plan view (C), front view (D) and rear view (E).

FIG. 8 shows an alternative exemplary embodiment of a chain link 200, which differs from the first in that the specific articulated joint according to the third aspect is not implemented but rather a conventional articulated joint with joint pin 240 and joint receptacle 242, which define a revolute joint with predetermined axis of rotation. Otherwise, the essential features of the chain link 200 are substantially identical to that of FIG. 3.

In the case also of chain link 200, the first aspect of the invention is implemented, using a projection 205 on the first longitudinal portion 201 and a cross-bridge 206 on the second longitudinal portion 202, as is the second aspect, with a further cross-bridge 208 and an additional crosspiece 209. The three aspects of the invention are in each case advantageously applicable alone.

LIST OF REFERENCE SIGNS

FIGS. 1-2:
1 Line guide device
2, 4 Connection point
3 Supply line
5 Upper run
6 Lower run
7 Deflection arc
10 Envelope ("pod")
11 Clamping devices
12 Receiving duct
13, 14 Layers
20 Support chain
A Deflection axis
L Longitudinal direction
FIGS. 3-7:
20 Support chain
100 Chain link
101 First/front longitudinal portion
102 Second/rear longitudinal portion
102A, 102B Side parts
103 Space
104 Trunk region
105 Projection
106 Inside cross-bridge
107 Inside recess
108 Outside cross-bridge
109 Outside crosspiece
110A, 110B Extended stop faces
111 Contact face (on projection 105)
112 Contact face/mating face (on cross-bridge 106)
114A, 114B Arc stop faces
115A Active area
115B Abutment area
116 Protruding region
116A Further active area
116B Further abutment area
117A, 117B Latching pins
118A, 118B Latching cut-out
119A, 119B Insertion grooves
121 Front end face
122 Rear end face
123A, 123B Joint region (on end faces)
124A, 124B Arc contact faces
125A, 125B Extended contact faces
FIG. 8
200 Chain link
201 First/front longitudinal portion
202 Second/rear longitudinal portion
202A, 202B Side parts
203 Space
204 Trunk region
205 Projection
206 Inside cross-bridge
207 Inside recess
208 Outside cross-bridge
209 Outside crosspiece
211 Contact face (on projection 105)
212 Contact face/mating face (on cross-bridge 106)
240 Joint pins
242 Joint receptacle

The invention claimed is:

1. A support chain to support a line guide device with a flexible envelope, comprising:
    wherein the support chain is configured to adopt extended positions to form extended runs and an arcuate position to form a deflection arc,
    wherein the support chain has a plurality of individual chain links with a longitudinal direction, which individual chain links are connected together in an articulated manner,
    wherein the plurality of individual chain links each comprise a first front longitudinal portion and a second rear longitudinal portion complementary to the first front longitudinal portion, the second rear longitudinal portion having two side parts and a space between the two side parts, in which space the first front longitudinal portion of an adjacent chain link of the plurality of individual chain links is arranged, and each chain link of the plurality of individual chain links has an inside and an outside relative to the deflection arc, wherein, in an end region of the first front longitudinal portion and on the inside, the first front longitudinal portion has a projection protruding transversely of the longitudinal direction; and wherein the second rear longitudinal portion on the inside has an inside cross-bridge connecting the two side parts, with an extended stop face for the extended position, and a recess adjoining the inside cross-bridge at the front in the longitudinal direction;

wherein, in the extended position, the projection of one chain link of the plurality of individual chain links engages in the recess of the connected following chain link of the plurality of individual chain links and at the front on the inside cross-bridge thereof.

2. A line guide device for protected guidance of supply lines between two connection points, wherein at least one of the two connection points is mobile relative to the other connecting point, wherein the line guide device has a longitudinal direction, wherein the line guide device is displaceable to-and-fro forming two runs and a deflection arc, the line guide device comprising:

a flexible envelope with a number of receiving ducts arranged next to one another, wherein the number of receiving ducts extends in the longitudinal direction and a respective receiving duct of the number of receiving ducts is configured for receiving at least one supply line of the supply lines; and at least one support chain, which is arrangeable in a receiving duct of the number of receiving ducts to support the line guide device, wherein the at least one support chain is configured to adopt extended positions to form extended runs and an arcuate position to form a deflection arc, wherein the at least one support chain has a plurality of individual chain links with a longitudinal direction, which individual chain links are connected together in an articulated manner, wherein the plurality of individual chain links each comprise a first front longitudinal portion and a second rear longitudinal portion complementary to the first front longitudinal portion, the second rear longitudinal portion having two side parts and a space between the two side parts, in which space the first front longitudinal portion of an adjacent chain link of the plurality of individual chain links is arranged, and each chain link of the plurality of individual chain links has an inside and an outside relative to the deflection arc, wherein, in an end region of the first front longitudinal portion and on the inside, the first front longitudinal portion has a projection protruding transversely of the longitudinal direction; and wherein the second rear longitudinal portion on the inside has an inside cross-bridge connecting the two side parts, with an extended stop face for the extended position, and a recess adjoining the inside cross-bridge at the front in the longitudinal direction;

wherein, in the extended position, the projection of one chain link of the plurality of individual chain links engages in the recess of the connected following chain link of the plurality of individual chain links and at the front on the inside cross-bridge thereof.

3. The support chain according to claim 1, wherein at the outside and in a rear end region, the second rear longitudinal portion has a transverse stop, which transverse stop lies opposite the outside of the first front longitudinal portion of the adjacent chain link as abutment for the extended position.

4. The support chain according to claim 3, wherein the first front longitudinal portion and the second rear longitudinal portions have stop faces which interact in the extended position and in that the projection and the inside cross-bridge have interacting contact faces which lie substantially perpendicular to the extended stop faces and are arranged such that the projection of one chain link rests, in the extended position, with the contact face of the projection against the contact face of the inside cross-bridge of the following chain link.

5. The support chain according to claim 1, wherein the projection forms a contact face for resting against the inside cross-bridge, which is arranged substantially perpendicular to the longitudinal direction.

6. The support chain according to claim 1, wherein the projection extends over the entire width of the first front longitudinal portion cross-sectionally relative to the longitudinal direction and/or the projection projects with a protrusion of at least 5% or at least 10% of the structural height of the chain link cross-sectionally relative to the longitudinal direction.

7. The support chain according to claim 1, wherein the projection is arranged in the terminal front quarter of the first front longitudinal portion and the inside cross-bridge is arranged in the remote rear half of the second rear longitudinal portion.

8. The support chain according to claim 1, wherein the recess forms an opening from the space toward the inside.

9. The support chain according to claim 1, wherein each chain link of the plurality of individual chain links includes an outside crosspiece on the outside in its second rear longitudinal portion, wherein the inside cross-bridge and the outside crosspiece connect the two side parts and span the space, and in that the inside cross-bridge interacts in the extended position with an inside extended stop face of the first front longitudinal portion and the outside crosspiece interacts in the arcuate position with an outside arc stop face of the first front longitudinal portion.

10. The support device according to claim 1, wherein the chain link is produced in one piece from plastics material.

11. A chain link of the plurality of individual chain links for a support chain, wherein the chain link has the features according to claim 1.

12. A support chain for supporting to support a line guide device with a flexible envelope, comprising:

wherein the support chain is configured to adopt extended positions to form extended runs and an arcuate position to form a deflection arc, wherein the support chain has a plurality of individual chain links with a longitudinal direction, which individual chain links are connected together in articulated manner, wherein the plurality of individual chain links each comprise a first longitudinal portion and a second longitudinal portion complementary to the first longitudinal portion, the second longitudinal portion having two side parts and a space between the two side parts, in which space the first longitudinal portion of an adjacent following chain link of the plurality of individual chain links is arranged, and each chain link of the plurality of individual chain links has an inside and an outside, wherein each chain link of the plurality of individual chain links includes an outside cross-connection on the outside in the second longitudinal portion of the chain link and an inside cross-connection on the inside, wherein the outside cross-connection and the inside cross-connection span the space and connect the two side parts, and in that the inside cross-connection interacts in the extended position with an inside extended stop face of the first longitudinal portion and the outside cross-connection interacts in the arcuate position with an outside arc stop face of the first longitudinal portion.

13. The support chain according to claim 12, wherein the outside cross-connection is embodied as a crosspiece and the inside cross-connection is embodied as a cross-bridge; and wherein each chain link of the plurality of individual chain links includes, in its second longitudinal portion, the crosspiece on the outside in the front region and an outside cross-bridge in a rear end region; wherein the first longitudinal portion includes a protruding region on the outside which engages in the arcuate position between the crosspiece and the outside cross-bridge, and wherein the first longitudinal portion wedges together with the second longitudinal portion in the arcuate position.

14. The support chain according to claim 12, wherein the first longitudinal portion is insertable into the space in the second longitudinal portion of the adjacent following chain link in the longitudinal direction.

15. The support chain according claim 14, wherein the first longitudinal portion and the second longitudinal portion are embodied to form a latched connection against detachment in the longitudinal direction, each chain link of the plurality of individual chain links having, in the one longitudinal portion of the first longitudinal portion and the second longitudinal portion, two opposing pins projecting laterally relative to the longitudinal direction, wherein each pin is latchable together with a corresponding cut-out in the other longitudinal portion of the first longitudinal portion and the second longitudinal portion, wherein the pins have insertion bevels tapering obliquely in the longitudinal direction.

16. The support chain according to claim 15, wherein each chain link of the plurality of individual chain links includes insertion grooves for the pins opening into the cut-outs and extending substantially in the longitudinal direction.

17. A support chain to support a line guide device with a flexible envelope, comprising:
wherein the support chain is configured to adopt extended positions to form extended runs and an arcuate position to form a deflection arc,
wherein the support chain has a plurality of individual chain links with a longitudinal direction which individual chain links are connected together in articulated manner,
wherein the plurality of individual chain links each comprise a first front longitudinal portion and a second rear longitudinal portion complementary to the first longitudinal portion, the second rear longitudinal portion having two side parts and a space between the two side parts, in which space the first front longitudinal portion of an adjacent following chain link of the plurality of individual chain links is arranged, and
wherein the two side parts of the second rear longitudinal portion each include a front end face and a rear end face,
wherein the front end face and the rear end face lie opposite one another in the case of adjacent chain links of the plurality of individual chain links,
wherein the front end face forms a joint region and the rear end face forms a joint region, such that the respective joint regions of the front end face of one chain link of the plurality of chain links and the rear end face of an adjacent chain link of the plurality of chain links interact for articulated connection of these two chain links.

18. The support chain according to claim 17, wherein the joint region of the front end face is convexly configured and the joint region of the rear end face is concavely configured and/or the joint region of the front end face and the joint region of the rear end face are embodied for a swivelable articulated connection with a swivel axis perpendicular to the longitudinal direction.

19. The support chain according to claim 17, wherein the front end face and the rear end face form in a heightwise direction at least on one side of the joint region a contact face for the arcuate position or extended position.

20. The support chain according to claim 19, wherein, in a one longitudinal portion of the first front longitudinal portion and the second rear longitudinal portion, each chain link of the plurality of individual chain links includes two opposing pins projecting laterally relative to the longitudinal direction and, in the other longitudinal portion of the first front longitudinal portion and the second rear longitudinal portion, each chain link of the plurality of individual chain links includes two cut-outs, wherein each pin of the two opposing pins is latchable together with a corresponding cut-out of the two cut-outs, wherein each cut-out of the two cut-outs run in arc of a circle-shaped manner in the side parts in a longitudinal plane.

\* \* \* \* \*